June 25, 1929.  L. LAVEDAN  1,718,910
PROCESS OF MANUFACTURING YEAST
Filed July 1, 1925
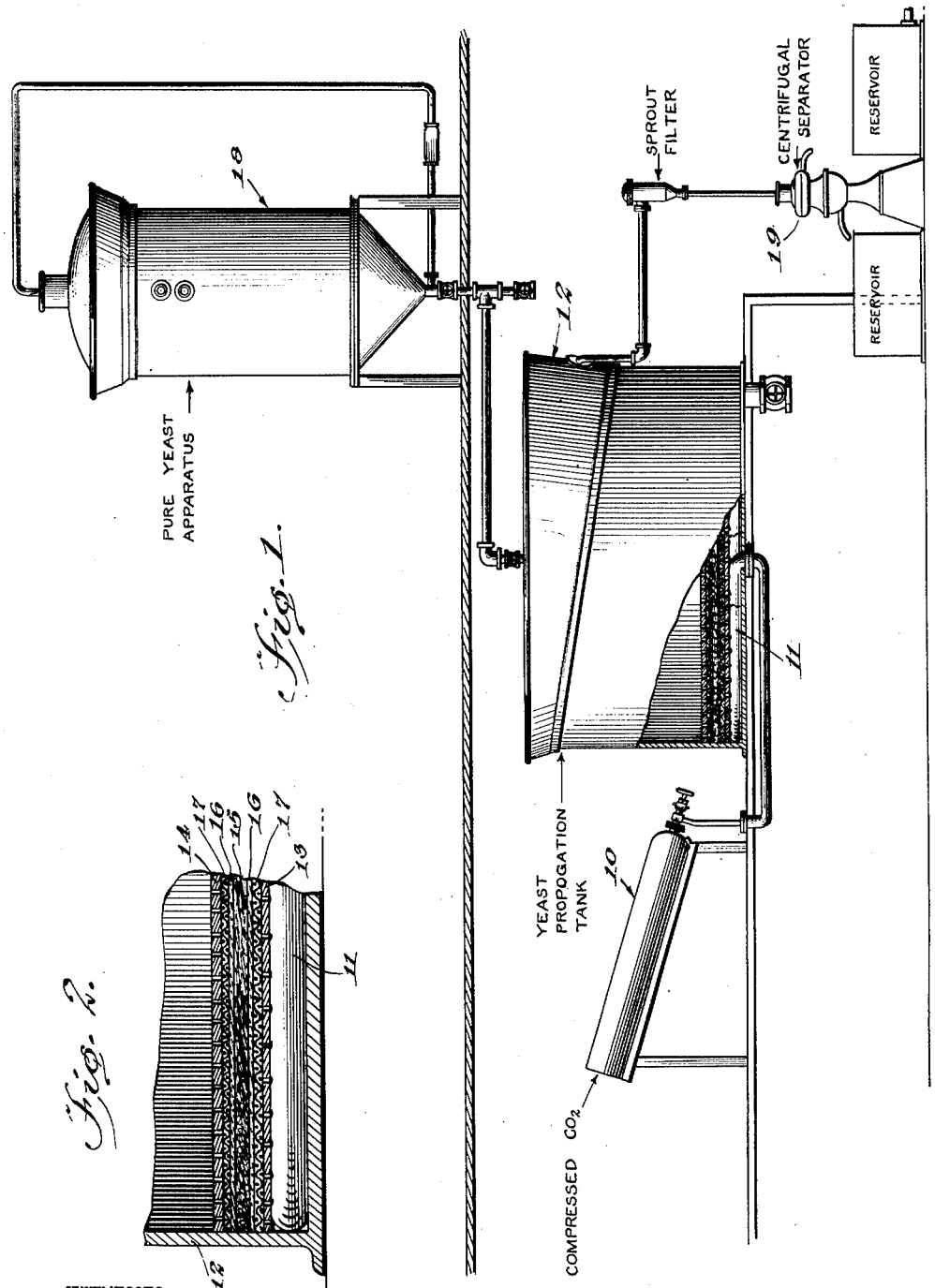
WITNESSES
INVENTOR
Lucien Lavedan,
BY
ATTORNEYS Patented June 25, 1929.

1,718,910

UNITED STATES PATENT OFFICE.

LUCIEN LAVEDAN, OF NEW ORLEANS, LOUISIANA.

PROCESS OF MANUFACTURING YEAST.

Application filed July 1, 1925. Serial No. 40,924.

My invention relates to improvements in processes of manufacturing yeast and it consists in the use of carbon dioxide, $CO_2$, in the various stages and steps taken during yeast propagation and after the propagation has been completed, and also in the subsequent production of carbonated yeast whether liquid, compressed, or dried.

The primary object of my invention is to provide a process in which carbon dioxide is employed to more effectively carry out in the most suitable and efficient manner, the continuous process of making yeast with continuous aeration in propagating pure yeast in a pure sugared liquid of a given density in the presence of nutritive salts and air; with the separation of the scum containing the yeast thus propagated from the main body of the liquid, and subsequent separation of the yeast cells from the associated liquid of the scum, with the addition of sufficient sugared solution to the separated liquid to bring the main sugared solution to its original density when the separated liquid is returned to it, as described in my Letters Patent No. 1,201,062, on a continuous process with continuous aeration, granted October 10, 1916, the cold carbon dioxide acting as a suitable agent to neutralize an excess of alkalinity, and at the same time operating to reduce the temperature of the wort.

Another object of my invention is to provide a process to produce from a given amount of raw materials, the highest possible yield of yeast possessing an increased vitality and strength for baking, fermenting, diet and any other uses, while simultaneously decreasing the production of alcohol.

A further object of my invention is to produce yeast which will keep for a longer period of time than yeast produced by other processes and methods.

A further object of my invention is to produce yeast possessing a higher vitamine and nutrient value, and far more suitable to be used for eating purposes as it is more adapted to conditions existing in the human stomach, more palatable and of better odor and taste, and possesses a more effective action than any other yeast produced by other processes and methods.

A further object of my invention is to provide a process to reduce or neutralize in a ready, prompt and efficient manner an excess of alkalinity in the wort at any stage of yeast propagation as well as when and after it is completed.

A further object of my invention is to provide a process in which an acid reaction is produced in the most efficient manner in the wort at any stage of yeast propagation as well as when and after it is completed.

A still further object of my invention is to provide a process in which a most desirable, suitable and efficient agent is employed such as carbon dioxide, to reduce promptly the temperature of the wort or liquid in incipient fermentation at any desirable stage of yeast propagation and also to maintain the liquid at such temperature.

A further object of my invention is to provide a process in which the most desirable, suitable and efficient agent is employed such as using carbon dioxide to reduce promptly the temperature of the wort to any desirable temperature, after the yeast propagation is completed.

A further object of my invention is to provide a process in which an efficient agent or agents is employed, such as any suitable innocuous alkali, carbonate, calcium salt, chalk, or any suitable combination of these agents, to neutralize first the wort and then provide an acid reaction by means of carbon dioxide at any stage of yeast propagation or after the propagation has been completed.

A further object of my invention is to provide a process in which a very efficient agent or agents such as any suitable alkali, carbonate, calcium salt, chalk, or any suitable combination of same, is used for neutralizing the acidity in the wort and producing a slight alkalinity, and in which carbon dioxide is employed in order to acidify slightly said slight alkalinity in a prompt and efficient manner in the wort after the yeast propagation is completed, and then subsequently producing a certain low degree of acidity and a predetermined low degree of temperature in the wort, thus providing for a most desirable flocculation, settling and precipitation of the yeast.

A further object of my invention is to provide a process in which a most suitable refrigerating and protecting agent, such as carbon dioxide, is used to reduce oxidation, hydrolysis and decomposition of the yeast for a long period of time as hereafter mentioned; to reduce the acid reforming powers of the yeast during a long period of time; to reduce the aspiration and subsequent oxidation of the yeast during a long period of time; to increase the power to absorb moisture in compressed yeast; to create a carbon dioxide environment in the mass of yeast for a definite period of time, to prevent the yeast cells from becoming active because of free acidity and to keep the yeast activity and strength for a longer period of time than any other yeast not so treated.

A further object of my invention is to provide a semi-insulating protective and nutrient coating all around the yeast cake of suitable nutrient and activating substances to supply the cells with food when the yeast shall resume its activity, said coating also sufficiently insulating the yeast cells to prevent said cells from coming in direct contact with a refrigerating agent which would injure the cells.

A still further object is to provide a process with the most suitable and efficient and protective agent, such as carbon dioxide to check the activity of the compressed yeast, holding its strength and keeping it fresh, of sweet taste and color for a longer period of time than by any other process, uses and methods.

Other objects and advantages will appear in the following specification, and the novel features of the invention will be particularly pointed out in the appended claims.

I shall now described the process of using carbon dioxide ($CO_2$) in the various stages and steps of manufacturing "carbonated" yeast, giving examples of the method, manner and means in which it can be carried out.

In the drawing:

Figure 1 shows more or less diagrammatically an apparatus for carrying out my process.

Figure 2 is a fragmentary vertical section of a propagating tank constructed according to the principles of my invention.

The yeast propagating process is carried in a wort of any suitable composition made in accordance with the usual methods of manufacture, preferably with the most up to date efficient process of continuous aeration, such as described in my Letters Patent No. 1,201,062. No claims are made as regards the most suitable and efficient nutrient, activating acidifying and neutralizing substances used in the production of the wort, as these and their well balanced proportions are well known and used for these last thirty years in the manufacture of yeast, and its related industries of pure yeast culture, fermenting and brewing. It is to be understood that I employ carbon dioxide ($CO_2$) by itself from a source extraneous of the carbon dioxide directly produced in the yeast and also in connection with other substances, at any stage of yeast propagation, also at the time it is completed and after it is completed.

The first stage of my process of using carbon dioxide is reached at such a time of the yeast propagation that the wort shows a too high acidity, also a too high temperature to be efficient in the propagation of the yeast cells; then the first step to be taken for the purposes herebefore and hereafter further enumerated, is as follows:

After testing rapidly the wort for its degree of acidity and temperature, the necessary amount of carbonate of calcium, ammonia water, sodium hydroxide, etc. is used, not only to neutralize it but also to reach a certain slight alkaline reaction as indicated by a slight alkaline reaction in the wort. I employ only a calcium salt such as bi-carbonate of calcium, calcium carbonate, lime water, or chalk, or such other neutralizing agent, ammonia, ammonia water, sodium hydroxide or such other alkali which can be neutralized completely by the acids in the propagating wort. At this stage of the process it is necessary to neutralize rapidly the wort and render the same slightly alkaline preliminarily to the injection of the carbon dioxide vapor. Therefore it is best to delay the addition to the wort of such inorganic salts generally used as yeast nutrients in the propagation process which give out free acids and which would delay a prompt neutralization of the wort and thus render said wort slightly alkaline for a short period of time. The necessary amount of such inorganic salts can be added as soon as the wort is rendered slightly alkaline. Such salts that are employed generally at this time are ammonium sulphate and potassium sulphate. Those compounds which not only serve to neutralize the acidity in the wort, but also supply the assimilable nitrogen required for the production of a good yeast are not employed. However, if the wort at the time requires such substance, it is best to use such which will furnish it and at the same time neutralize the acidity of the wort. The usual fractional and necessary amount of such salts are added with advantage after this step of my process is accomplished. The above holds true, taking in consideration the composition and conditions of the wort, for the following two or more steps of my process; and more particularly for the last one which is made just a little before (15 to 20 minutes) the propagation is completed when it is not then a question of carrying on successfully the propagation for a long length of time, but to produce a yeast which will flocculate, settle and separate promptly and which is not slimy and deficient in one or other substances, and which possesses baking strength and keeping qualities.

Then, as soon as that certain slight alkaline reaction is reached, the necessary amount of carbon dioxide ($CO_2$) is injected at the bottom of the propagating tank, to neutralize the alkaline excess for producing a certain slight acid reaction in the wort, for the objects and purposes herebefore and hereafter specified.

The carbon dioxide gas, compressed to the point of liquefaction, at approximately a pressure of 950 lbs. to the square inch or 65 atmospheres and supplied from a cartridge 10, is injected and delivered very slowly through a perforated pipe 11 to the bottom of a propagating tank 12. The carbon dioxide from pipe 11 or an expansion chamber must pass through a protective mat formed of a pair of spaced sheets of perforated tin 13 and 14, an intermediate sheet of felt 15, a sheet of linen 16 upon each face of the felt, and a copper screen 17 between each linen sheet and the sheet of tin. A pure yeast apparatus 18 is connected with the tank 12 and is adapted to supply said tank with a selected pure yeast acclimated to propagate efficiently in a slightly acid wort. A separator 19 is employed for the usual purpose.

The construction shown in Figure 2 prevents the carbon dioxide snow from coming in contact with the cells and thus prevents the destruction or material injury to the yeast cells. When the fluid gas escapes, its sudden expansion causes a rapid fall of its temperature, and its delivery at the bottom of the tank has to be regulated on such a ratio of speed and pressure that a fine pulverized white snow is formed at the bottom of the screen sheet 13 where the carbon dioxide gas is liberated and returns to the expanded gaseous state and bubbles through the liquid yeast or wort, thereby reducing promptly the temperature and the pre-arranged excess of alkalinity. The gas is turned on very slowly to permit the carbon dioxide ($CO_2$) to evaporate through the wort and neutralize its alkaline salts, to such an extent that a certain slight acid reaction in the wort is reached.

This first addition of alkalies and other substance and injection of carbon dioxide is done at such a time when the wort has reached, as before said, a too high acidity and temperature, or about 3 to 4 hours after starting the propagation. The second addition and injection is done in the same way and manner as the first one, and at such a time it is found necessary, which is about 2 to 3 hours later, and the third or last one is done just a little before the propagation is completed, in the same way and manner, taking in consideration what has been heretofore stated relative to the use of the most suitable neutralizing agent. The exact limit of time when these three or more if necessary, steps have to be taken, vary widely according to many factors in the process of propagation, and is determined by observation, testing and practice.

The objects and results of the steps taken are obvious. It is a matter of fact and of usual knowledge for a generation, that high acidities and high temperatures in the process of propagating yeast, have to be and are usually properly reduced. In the necessity of having to reduce the ever increasing acidity and free acids, as well as the temperature of the wort, fractional steps are far more desirable and efficient than continuous additions or continuous reductions, as these are practically impossible to be carried in a suitable and efficient manner; and also because yeast cells, saccharomyces of all species are "biological" and therefore do not remain inactive. They must change, that is they live, produce and die, and their following generations possessing most of the time a much lower vitality and strength, at times necessitate a somewhat different environment and varying conditions.

Briefly stated, yeast cells must be first cultivated and acclimated gradually or by steps in a certain increasing environment in order to attain an increasing efficient propagation and this is also true of their generations following at such a time that the environment becomes innocuous and does not propagate efficiently.

It is also a matter of fact and of usual knowledge for the last thirty years or more that a selected pure yeast can be cultivated and acclimated to propagate efficiently either in a certain environment or in a wort of either low or a relatively high acidity, but the cells will not propagate in a manner as efficiently in a wort of slight alkalinity. Preference has to be given to a slight as possible acidity, particularly in the propagation of yeast for baking, fermenting and diet purposes. High acidity impairs not only the production but also the quality and strength of the yeast cells. In a slight alkaline wort, their propagation as well as the vitality and strength is comparatively much less. Therefore it is more desirable to select, cultivate, acclimate a pure yeast to work efficiently in a slight acidity re-arranged from time to time with other varying conditions of the process, and subsequently their generations will be efficient in the following propagating process. The advantages are obvious and numerous in the process and practice of using carbon dioxide to reach a slight acid reaction and reduce promptly the temperature in the propagating process.

Further, my process is not only most efficient, but also most economical. The quantity of alkali and other stated suitable substances, also the amount of carbon dioxide ($CO_2$) required are very small comparatively to the results obtained. For instance, in a wort of a slight acidity such as used in my process, one gramm of caustic soda 80% C. P. per gallon of wort is sufficient to neutralize the acidity and reach a slight alkaline reaction in the wort. Only a total of 25 lbs. of carbon dioxide ($CO_2$) are used in the three fractional steps herebefore mentioned.

About 5 lbs. in the first, 5 to 10 in the second and the balance in the last step a little before the time the process of propagation is completed. In the second stage and steps of my process with a proper equipment not over 75 lbs. of carbon dioxide ($CO_2$) for a production of 2000 lbs. of compressed yeast, are used, and $CO_2$ besides acting as a protective and agent and for other numerous purposes hereinbefore and hereafter mentioned, acts as a most efficient refrigerating agent at the proper time.

Compressed yeast deteriorates and loses its vitality and strength, particularly so when it is or becomes rapidly highly acid. Various experiments carried out to investigate the action of a highly acid yeast upon solutions of calcium lactate and other mineral salts, have demonstrated that the oxidation of the calcium lactate proceeds rapidly and is accelerated by increased proportions of ammonium phosphate, calcium and magnesium sulfates, and that the oxidation takes place more rapidly at the surface of the yeast cake than in the inside of it. Lactic acids and others are partly decomposed and in a very short time, and all the carbohydrates of the yeast are partly hydrolized in the presence of air, and very rapidly if the compressed yeast is not kept at a low temperature, approximately the temperature of freezing water.

The second phase and second steps of my process are carried out in a manner which I shall now describe:

After the compressed yeast is made in accordance with the usual methods of manufacture, a certain amount of a dry mixture, preferably powdered or a solution amounting to about 10% of the weight of the compressed yeast, is made of sugar, a calcium salt, an ammonium salt or any other suitable substances. I use preferably 3% of the weight of compressed yeast in calcium phosphate; 2% in ammonium tartrate, and 5% in powdered inverted sugar.

Before wrapping up the yeast cake, a certain amount of the above ingredients, approximately 10% of the weight of said yeast cake, is coated all around the surface of the said compressed yeast cake. The cakes are wrapped up with clean linen or muslin, gauze and set in rows, each cake being slightly spaced from another and then frozen by carbon dioxide ($CO_2$) in an ice box specially built for that purpose.

Then the carbon dioxide ($CO_2$) under pressure, is turned on very slowly and delivered at the bottom of each row of the yeast cakes to freeze them on the surface in such a manner until they are coated with carbon dioxide snow and until the yeast cakes are almost perfectly hard. When this is done, the yeast cakes will remain hard for hours depending on the hardness of the carbon dioxide snow. This hardness gives ample time for removing the frozen yeast cakes and for placing them in cardboard boxes or other containers without being materially affected by the outside temperature when said cakes may be put into an ice box or packed for shipment with ice, preferably with carbon dioxide ice.

This is preferably done after coating the compressed yeast cake with a dry mixture or a solution of insulating, protecting as well as nutrient substances as previously described. However, in using carbon dioxide with discretion, this can also be done without said dry mixture, and the yeast can be carefully wrapped up with muslin tissue paper or other sufficient, partially or totally insulating materials, and the freezing of the yeast with carbon dioxide ($CO_2$) can be effected, if not in a perfect manner and condition, at least in a sufficient suitable manner. Therefore, I claim the use of carbon dioxide to freeze and keep the yeast although this should not be coated with the protective and nutrient mixture as hereabove specified.

Carbon dioxide as the final treatment may be applied in different ways and methods, taking however in due consideration that it is essential to have a certain coating all around the yeast cake, so as to not destroy the yeast cells by contact with carbon dioxide snow. The center of the yeast cake must be only slightly frozen. The yeast cells are there "at rest", hibernating in the slightly frozen mass, and will start life again with renewed vigor and activity, when the mass shall be allowed to thaw and the temperature rises again. The longer the pressure of carbon dioxide ($CO_2$) is maintained, the deeper the freezing penetrates. The surface of the yeast cake is only required to be frozen sufficiently hard as before stated. Carbonated yeast, that is yeast so treated, will retain its baking strength as well as all other qualities about two months, and much longer if kept in suitable ice boxes, preferably carbon dioxide ice.

With the use of carbon dioxide in addition to the advantages herebefore stated, there is also the big advantage in reference to the caking quality of the yeast so treated in conjunction with calcium salts, of absorption of moisture without heating, and this absorption efficiency, will keep the compressed yeast under a 10% moisture content. The carbon dioxide ($CO_2$) snow returning to the gaseous state, furnishes a carbon dioxide environment to the mass of the yeast, checking respiration, reactions, decomposition, moulding, re-forming of acids and the activity of the yeast. It keeps the yeast fresh, of sweet taste and color, until such a time it shall be allowed to become active and be used.

The yeast in liquid form may be bottled and when in such condition said yeast may be impregnated with carbon dioxide gas with the results as stated above.

What I claim is:

1. A step in the process of propagating yeast which comprises injecting into the yeast wort, before the temperature has been appreciably raised, cold vapors formed by the evaporation of liquid carbon-dioxide.

2. A step in the process of propagating yeast which comprises adding slightly in excess neutralizing agents to a yeast wort having an acid reaction to produce an alkaline reaction, then injecting cold carbon dioxide into the wort before the temperature thereof has been appreciably raised to produce a low degree of acidity.

3. A step in the process of propagating yeast which comprises adding slightly in excess neutralizing agents to a yeast wort having an acid reaction to produce an alkaline reaction, then injecting into the yeast wort before the temperature thereof has been appreciably raised, cold vapors formed by the evaporation of liquid carbon dioxide to produce a low degree of acidity and temperature.

4. A step in the process of propagating yeast which comprises adding slightly in excess neutralizing agents to a yeast wort having an acid reaction to produce an alkaline reaction, then after yeast cells have been propagated injecting into the yeast wort cold vapors of carbon dioxide before the temperature thereof has been appreciably raised, to cause flocculation, settling and precipitation of yeast cells.

5. A step in the process of propagating yeast which comprises adding slightly neutralizing agents to a yeast wort having an acid reaction to produce an alkaline reaction, then after yeast cells have been propagated injecting into said yeast wort before the temperature has been appreciably raised, cold vapors formed by the evaporation of liquid carbon dioxide and then injecting at intervals more cold vapors formed by the evaporation of liquid carbon dioxide into the yeast wort.

6. A step in the process of propagating yeast which comprises injecting into the bottom of a column of yeast wort having a slight acid reaction before the temperature thereof has been appreciably raised, cold vapors formed by the evaporation of liquid carbon dioxide for progressively cooling the column of yeast propagating wort.

7. A step in the process of propagating yeast which comprises adding neutralizing agents to a column of yeast wort having a slight acid reaction to produce an alkaline reaction, then injecting into the bottom of the column of the yeast wort before the temperature thereof has been appreciably raised, cold vapors formed by the evaporation of liquid carbon dioxide for progressively cooling the column of yeast propagating wort.

8. A process of propagating yeast which comprises treating a wort which has a too high acid reaction and a too high temperature for the propagation of yeast cells during the propagation of yeast therein, with an alkaline reagent while changing the acidity of the wort to a slight alkalinity, cooling the wort with cold vapors formed by expanding liquefied carbon dioxide while changing the alkaline reaction of the wort to a slight acid reaction.

9. A step in the process of propagating yeast which comprises impregnating a liquid in incipient fermentation such as a yeast propagating wort having a slight alkaline reaction with compressed carbon dioxide when the compressed carbon dioxide is expanded under pressure while controlling the temperature of the liquid and continuing the treatment with the carbon dioxide until the liquid shows a slight acid reaction.

10. A step in the process of propagating yeast which comprises impregnating at intervals a liquid in incipient fermentation such as a yeast propagating wort, having a slight alkaline reaction with compressed carbon dioxide when said carbon dioxide is expanding under pressure and controlling the temperature of the liquid and continuing the treatment with carbon dioxide until the liquid shows a slight acid reaction.

11. A step in the process of propagating yeast which comprises chilling a liquid in incipient fermentation such as a yeast propagating wort having a slight alkaline reaction by forcing the cold gases and vapors from expanding liquefied carbon dioxide through said liquid until said liquid shows a slight acid reaction.

12. A step in the process of propagating yeast which comprises treating a liquid in incipient fermentation such as a yeast propagating wort having a slight acid reaction with an alkaline reagent until said liquid shows a slight alkaline reaction, cooling the wort by impregnating the liquid having a slight alkaline reaction with carbon dioxide having a temperature less than the temperature of the liquid while changing the alkaline reaction to a slight acid reaction.

13. A step in the process of propagating yeast which comprises adding an alkaline reaction producing substance to a wort which has a slight acid reaction until said wort shows a slight alkaline reaction, expanding cold compressed carbon dioxide in the wort while at the same time impregnating the wort with cold gas and vapors of the carbon dioxide until said wort shows a slight acid reaction and a reduction in temperature of the wort.

14. A step in the process of propagating yeast which comprises adding an alkaline reaction producing substance to a wort having an acid reaction with a calcium compound to change the wort to a slight alkaline reaction and then impregnating the wort with expanded cool gases and vapors formed by expanding compressed carbon dioxide to cause a slight acid reaction and a temperature reduction.

15. A step in the process of propagating yeast which comprises expanding cold compressed carbon dioxide, injecting the expanded carbon dioxide vapors into a yeast propagating wort below the temperature of said wort while at the same time raising the temperature of the carbon dioxide to protect the yeast cells from freezing during the injection.

16. A step in the process of propagating yeast which comprises adding an alkaline reaction producing substance to a yeast propagating wort having a slight acid reaction until said wort shows a slight alkaline reaction and before the propagation of the yeast cells have been completed, then injecting cold carbon dioxide vapors into the wort which has a slight alkaline reaction to change such reaction to a slight acid while at the same time lowering the temperature of the wort below that of atmospheric for producing a yeast which will flocculate, settle and be easily separated.

LUCIEN LAVEDAN.